(12) United States Patent
Tsuduki (10) Patent No.: US 11,758,842 B2
(45) Date of Patent: Sep. 19, 2023

(54) MOWER MOUNTED ON WORK VEHICLE HAVING LIFTING LINKS

(71) Applicant: ISEKI & CO., LTD., Ehime-ken (JP)

(72) Inventor: Yoshihisa Tsuduki, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 413 days.

(21) Appl. No.: 17/066,290

(22) Filed: Oct. 8, 2020

(65) Prior Publication Data

US 2021/0144915 A1 May 20, 2021

(30) Foreign Application Priority Data

Nov. 19, 2019 (JP) .................................. 2019-208962

(51) Int. Cl.
*A01D 34/74* (2006.01)
*A01D 34/64* (2006.01)
*A01B 63/10* (2006.01)
*A01D 101/00* (2006.01)

(52) U.S. Cl.
CPC .............. *A01D 34/74* (2013.01); *A01B 63/10* (2013.01); *A01D 34/64* (2013.01); *A01D 2101/00* (2013.01)

(58) Field of Classification Search
CPC ...... A01D 34/74; A01D 34/64; A01D 34/661; A01B 63/10
See application file for complete search history.

(56) References Cited

U.S. PATENT DOCUMENTS

| 5,410,865 A   | * | 5/1995 | Kurohara | A01D 34/74 |
|               |   |        |          | 56/15.9    |
| 6,530,200 B1  | * | 3/2003 | Minoura  | A01D 34/64 |
|               |   |        |          | 56/15.2    |
| 9,021,776 B2  | * | 5/2015 | Zwieg    | A01D 69/03 |
|               |   |        |          | 56/17.1    |
| 2005/0044836 A1 | * | 3/2005 | Goto   | A01D 69/10 |
|               |   |        |          | 56/14.7    |

(Continued)

FOREIGN PATENT DOCUMENTS

JP          2012-178983 A    9/2012

OTHER PUBLICATIONS

JP 2012178983 A—English Translation—Sep. 20, 2012.*

*Primary Examiner* — Thomas B Will
*Assistant Examiner* — Julia C Tran
(74) *Attorney, Agent, or Firm* — Finnegan, Henderson, Farabow, Garrett & Dunner LLP (57) ABSTRACT

A work vehicle includes a mower connected to an abdomen of a running machine body via lifting links, a lifting interlocking link mechanism provided below the machine body for moving the mower up/down, and a link stopper connected to an adjustment dial and acting on the lifting interlocking link mechanism to change a cutting height of the mower. The adjustment dial is arranged on a seat support panel that supports an operator seat, and the link stopper, connected to the adjustment dial by a wire, is arranged below the machine body. A lifting lever for raising/lowering the mower is provided on one side of the left and right sides of the machine body, and a parking lever is arranged on the seat support panel on the other side. The adjustment dial is arranged between the parking lever and fenders covering rear wheels.

15 Claims, 9 Drawing Sheets

(56) References Cited

U.S. PATENT DOCUMENTS

| | | | |
|---|---|---|---|
| 2007/0169456 A1* | 7/2007 | Komorida | A01D 34/74 |
| | | | 56/17.1 |
| 2017/0156262 A1* | 6/2017 | Reichard | A01D 34/64 |
| 2017/0167112 A1* | 6/2017 | Nagai | E02F 3/3417 |
| 2017/0247021 A1* | 8/2017 | Krystowski | A01D 34/006 |

* cited by examiner

MOWER MOUNTED ON WORK VEHICLE HAVING LIFTING LINKS

CROSS REFERENCE TO RELATED APPLICATIONS

This application claims priority to Japanese Patent Application No. 2019-208962, filed Nov. 19, 2019, the disclosure of which is incorporated herein by reference in its entirety.

BACKGROUND

The disclosure relates to a work vehicle such as an agricultural tractor, and more particularly, to a structure of a lawn-mowing work vehicle that includes a mower mounted on a running machine body so as to be able to move up and down and a cutting height adjusting device for adjusting a cutting height of the mower.

As a riding lawn mower including a lawnmower below a running vehicle body having a driver's seat, there is known a riding lawn mower in which an adjustment dial is provided on one side of the left and right sides of the driver's seat, the lawnmower is connected to the adjustment dial by a link mechanism, and the cutting height can be adjusted by turning the adjustment dial (see JP-A-2012-178983).

SUMMARY

However, in the above configuration, a large link mechanism is required to connect a driver's seat on an upper part of a vehicle and a lawnmower on a lower part of the vehicle by a link mechanism. Therefore, the link mechanism is liable to interfere with other members and is difficult to assemble.

Some embodiments of the present disclosure may aim to provide a work vehicle which is capable of facilitating the assembly of a cutting height adjusting mechanism. Some embodiments may employ the following technical means in order to address the above issues.

In a first aspect, a work vehicle includes a mower connected to a lower part (e.g., an abdomen) of a running machine body via lifting links, a lifting interlocking link mechanism provided between a lifting link and the machine body so as to be able to move the mower in a vertical direction (e.g., up and down with respect to a ground surface), and a link stopper connected to an adjustment dial and acting on the lifting interlocking link mechanism to change a cutting height of the mower. The adjustment dial is arranged on a seat support panel that supports an operator seat, and the link stopper is arranged below the machine body. The adjustment dial and the link stopper are connected by a wire. Fenders covering rear wheels are provided on the left and right of the operator seat. A lifting lever configured to raise and lower the mower is provided on one side of the left and right sides of the machine body. A parking lever is arranged on the seat support panel on the other side of the left and right sides of the machine body. The adjustment dial is arranged between the parking lever and the fenders.

In addition to the first aspect, a second aspect may have a configuration that an axle case for supporting a rear axle is provided at a rear part of the running machine body, the link stopper is arranged below the axle case, a parking interlocking mechanism of the parking lever is arranged in front of the link stopper, and the wire is routed while bypassing the parking interlocking mechanism.

According to the first aspect, the adjustment dial provided on the seat support panel and the link stopper provided below the machine body are connected by the wire, and the wire can be routed while avoiding other members. Therefore, the cutting height adjusting device can be easily assembled.

Further, after operating the parking lever to safely stop and hold the machine body, a series of operation including that the mower is raised by operating a lifting lever, and then, the cutting height is changed by operating the adjustment dial, and the mower is lowered by operating the lifting lever again can be easily performed with both hands. By attaching the adjustment dial to the vicinity of the fender outside the parking lever, the adjustment dial can be easily attached from the outside of the machine body, and the assembly is facilitated.

According to the second aspect, in addition to the effect described in the first aspect, since the connection work by the wire is performed, the cutting height adjusting device can be retrofitted to the completed running machine body, and thus, the cutting height adjusting device can be easily assembled.

DESCRIPTION OF EMBODIMENTS

Hereinafter, an embodiment of a work vehicle will be described in detail with reference to the drawings.

Figure 1:
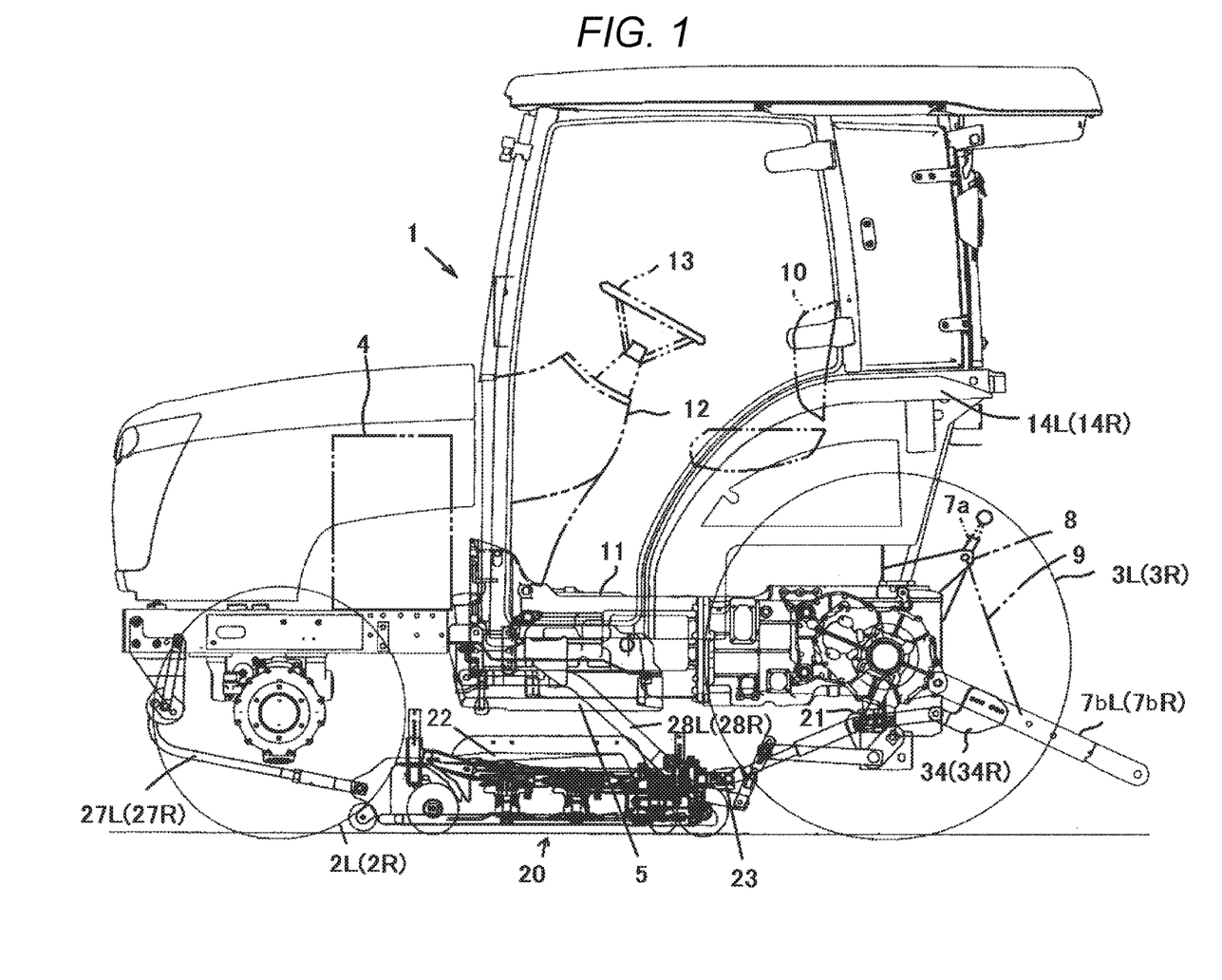
FIG. 1 is a side view of a tractor equipped with a mower, as an example of a work vehicle according to an embodiment.
Figure 2A:
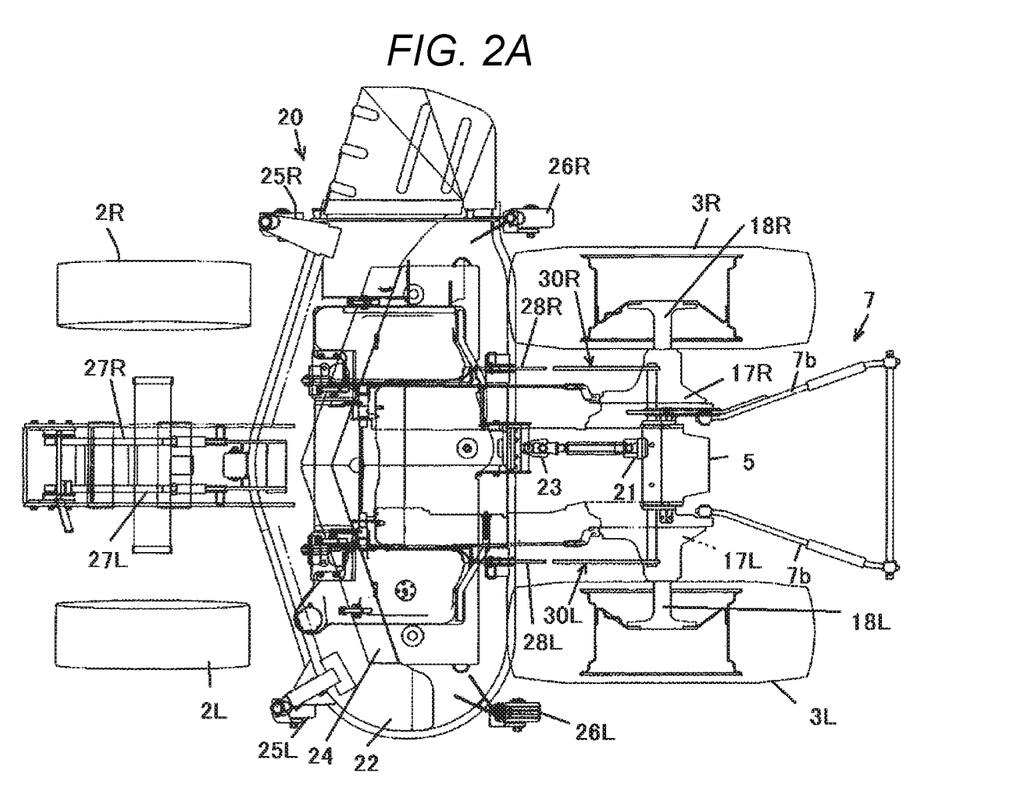
FIG. 2A is a plan view showing a connection structure of the mower in the above embodiment.
Figure 2B:
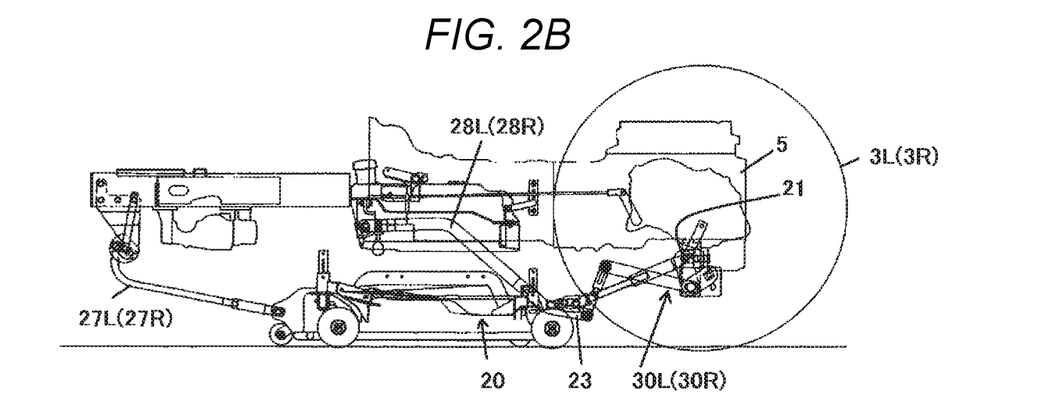
FIG. 2B is a side view thereof.
Figure 3:
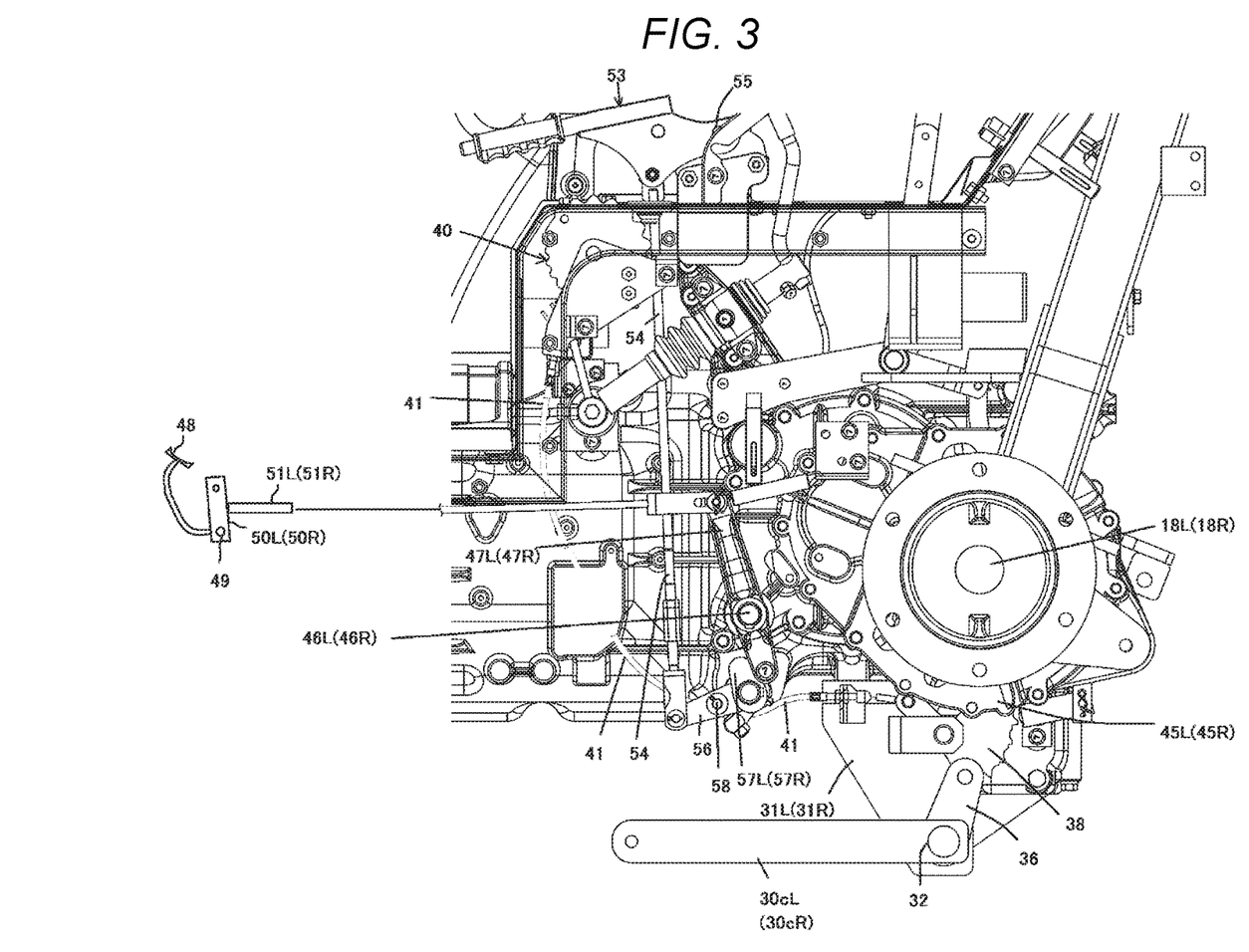
FIG. 3 is a side view showing a rear part and a peripheral structure of a transmission case in the above embodiment.

In FIGS. 1, 2 and 3, an agricultural tractor as a work vehicle performs a mowing work while self-propelled by power. The agricultural tractor includes left and right front wheels 2L, 2R that are provided on the front side of a machine body 1 and can be driven and steered, left and right rear wheels 3L, 3R mounted on the rear side of the machine body 1, an engine 4 as a power source, and a transmission case 5.

Further, a connection device 7 to which a rear work machine (not shown) such as a rotary device can be mounted is arranged at the rear part of the machine body 1 of the tractor. The connection device 7 is a three-point link including a top link 7a on the upper center and left and right lower links 7bL, 7bR on the lower side. The connection device 7 is configured such that the lower links 7bL, 7bR are pivoted via lift rods 9, 9 by pivoting a lift arm 8 with hydraulic pressure to vertically move a rear work machine (not shown).

The machine body 1 of the tractor includes an operator seat 10. A steering wheel 13 is erected from a dashboard 12 on the front side of the operator seat 10. Various operation pedals such as a clutch pedal, a brake pedal and an acceleration pedal, and various operation levers such as a forward and backward pedal and a shift lever are arranged around the operator seat 10.

A transmission mechanism is arranged in the transmission case 5. Power from the engine 4 is transmitted to a rear wheel differential mechanism (not shown) via a known forward/backward switching mechanism, a main transmission mechanism, and an auxiliary transmission mechanism. Left and right brake mechanisms 17L, 17R are provided at each end of left and right differential output shafts (not shown). A final reduction mechanism (not shown) configured by a combination of spur gears is formed between the left and right differential output shafts and rear axles 18L, 18R for supporting the left and right rear wheels 3L, 3R. In this way, the power of the engine 4 is transmitted to the rear wheels 3L, 3R and the front wheels 2L, 2R via a transmission mechanism in the transmission case 5. In the members provided in a pair on the left and right sides, the reference character L indicates the left side, and the reference character R indicates the right side. The left and right sides may be in a horizontal direction with respect to the machine body 1. The horizontal direction may be perpendicular to the vertical direction and may be parallel to the ground surface.

Furthermore, in the abdomen of the machine body 1, a mower 20 configured to cut vegetation grass by rotating a blade around a vertical drive shaft is arranged between the left and right front wheels 2L, 2R and the left and right rear wheels 3L, 3R to form a so-called mid-mower. Further, a side discharge mower having a grass discharge opening is provided on the right side of the mower 20. The power output from the engine 4 drives the mower 20 via a transmission output shaft 21 that branches a power transmission path in the transmission case 5.

Subsequently, a support structure of the mower 20 will be described. A mower deck 22 is formed to cover a rotating outer circumference and an upper surface of the blade of the mower 20. On an upper surface of the mower deck 22, a vertical drive shaft for driving the blade and a transmission input shaft 23 have a known structure for transmitting power through belts, and a transmission cover 24 for covering the transmission belts is provided to form a reinforcing structure. Front gauge wheels 25L, 25R and rear gauge wheels 26L, 26R are provided at the front and rear of the mower deck 22 so that the mower 20 can be supported on the ground. Further, a front surface of the mower deck 22 and a foremost frame portion of the machine body 1 are connected to be movable in a vertical direction (e.g., up and down) by a pair of left and right front lifting links 27L, 27R. On the other hand, rear lifting links 28L, 28R are formed by connecting a front upper end to the side of the machine body 1 so as to be pivotable in the vertical direction, and connecting a rear lower end side to the upper surface of the mower deck 22. The front lifting links 27L, 27R and the rear lifting links 28L, 28R are configured in a parallel link relationship and can be moved in the vertical direction with respect to the ground surface. Further, lifting interlocking link mechanisms 30L, 30R are provided on the rear side of the rear lifting links 28L, 28R. The lifting interlocking link mechanisms 30L, 30R include rod members 30aL, 30aR connected to the rear lifting links 28L, 28R, long holes 30bL, 30bR formed at upper ends of the rod members 30aL, 30aR, and pivot arms 30cL, 30cR supported by brackets 31L, 31R whose front sides are engaged with the long holes 30bL, 30bR and whose rear sides are fixed below the rear end side of the transmission case 5. The pivot arms 30cL, 30cR are fixed to a penetration shaft 32 pivotally supported by the left and right brackets 31L, 31R.

Further, operating arms 33L, 33R are fixedly provided on the penetration shaft 32, and drive arms 34L, 34R are provided between the operating arms 33L, 33R and the left and right lower links 7bL, 7bR. The operating arms 33L, 33R are pivoted downward in conjunction with the rising of the lower links 7bL, 7bR to pivot the penetration shaft 32. As a result, the pivot arms 30cL, 30cR and the like are pivoted upward to lift the mower 20. On the contrary, when the lower links 7bL, 7bR are lowered, the mower 20 is lowered in conjunction therewith. That is, the mower 20 is interlocked so that it is raised when the penetration shaft 32 is pivoted in a clockwise direction in FIG. 4 and it is lowered when the penetration shaft 32 is pivoted in a counterclockwise direction.

Figure 4:
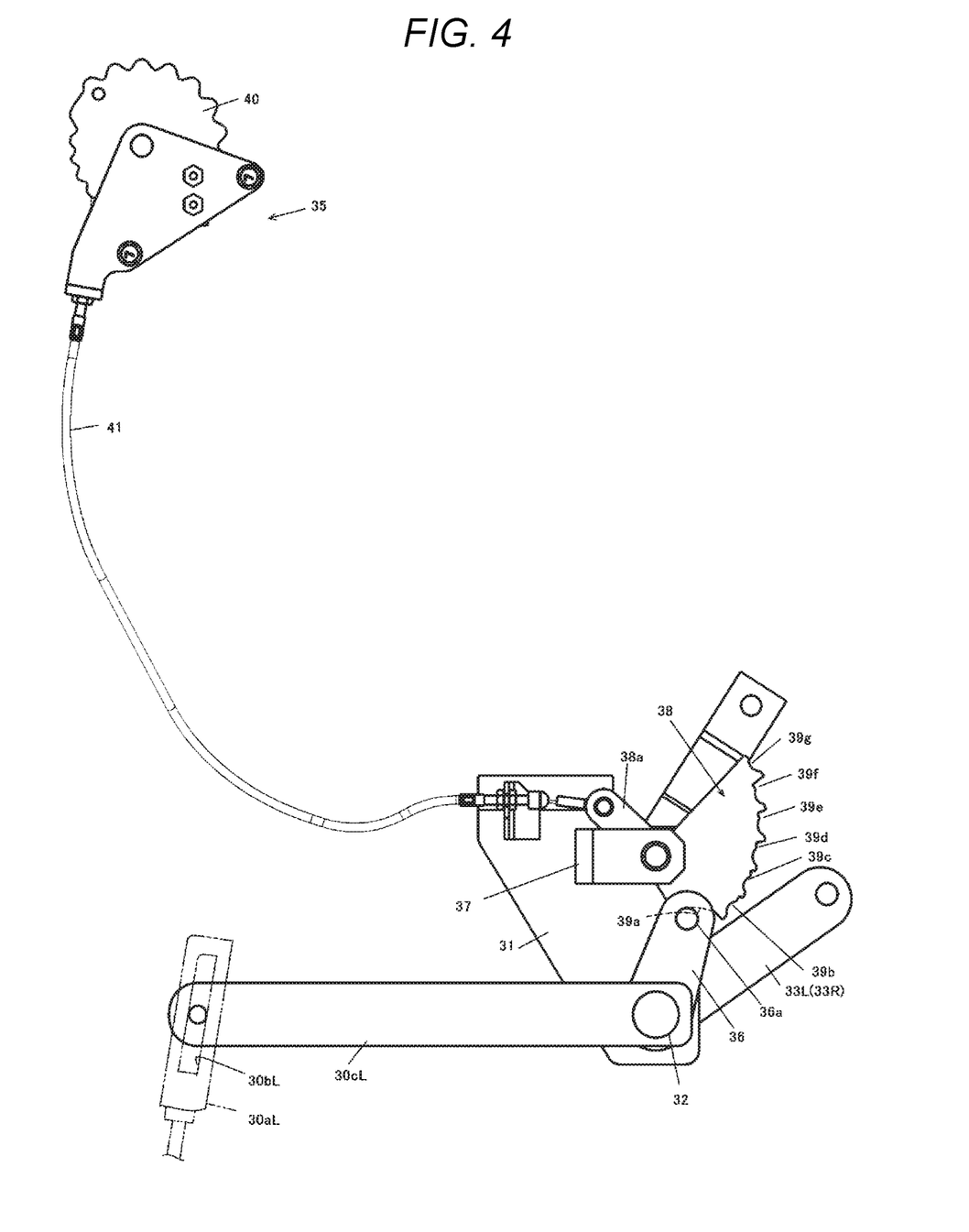
FIG. 4 is a side view of a cutting height adjusting device in the above embodiment.
Figure 5:
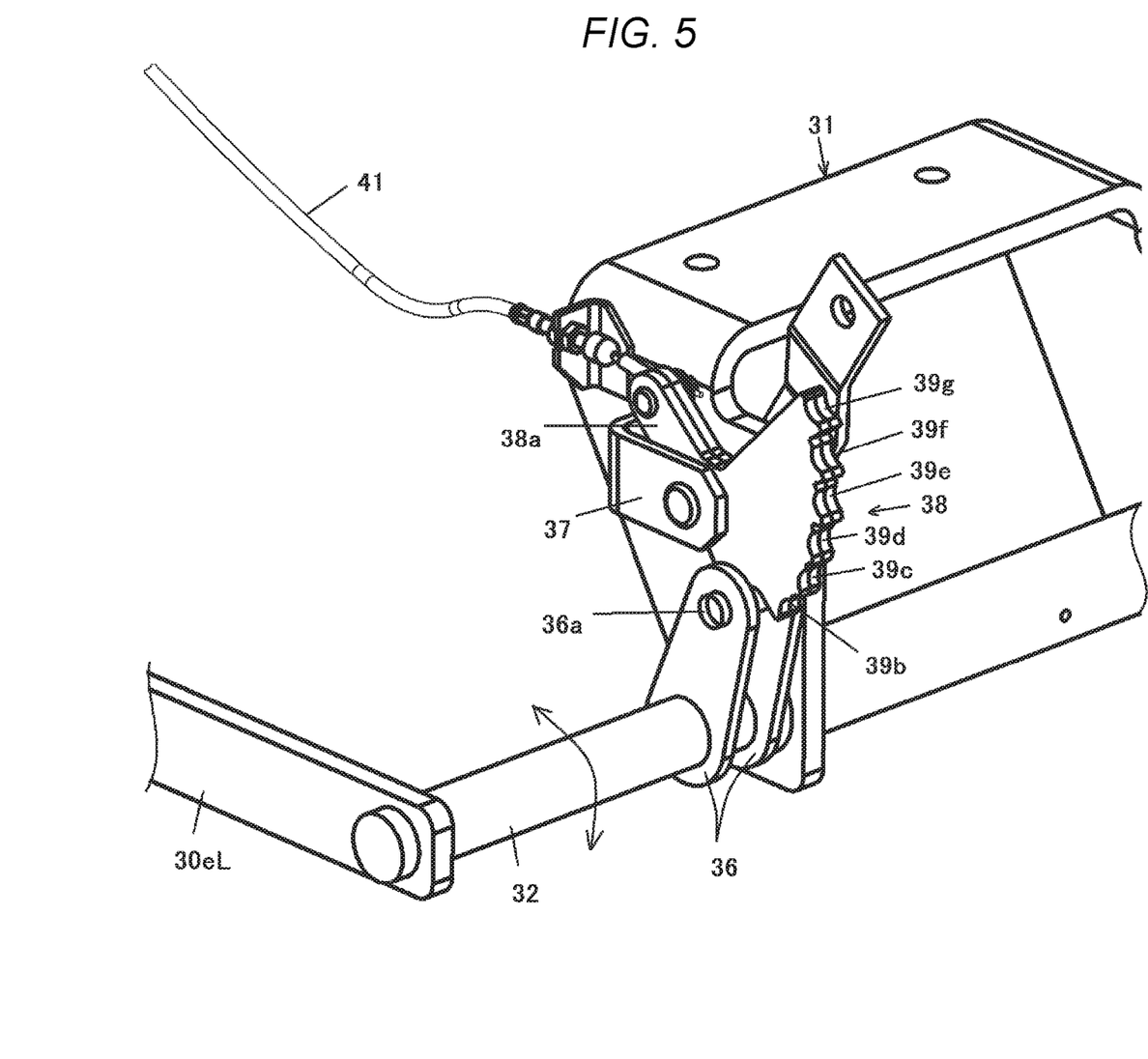
FIG. 5 is a perspective view of a link stopper part in the above embodiment.

Furthermore, a cutting height adjusting device 35 is provided on the side of the left lifting interlocking link mechanism 30L. An arm member 36 formed by a pair of plates and having a locking pin 36a is fixed to the penetration shaft 32. The locking pin 36a is locked by engaging with a height adjusting recess 39 of a link stopper 38 pivotally supported by a second bracket 37 extending from the bracket 31L. In this way, the locking pin 36a can restrict the pivoting of the penetration shaft 32 and the pivot arms 30cL, 30cR in the counterclockwise direction.

A plurality of height adjusting recesses 39 (e.g., seven height adjusting recesses 39a, 39b, . . . 39g in the illustrated example) are provided at predetermined intervals in a circumferential direction. Respective height adjusting recesses are formed in different radius lengths. The lowered positions of the mower 20 and the mower deck 22 are restricted by selectively setting the height adjusting recesses 39a, 39b, . . . 39g corresponding to the locking pin 36a based on the pivot operation around a shaft supporting the link stopper 38, so that the cutting height of the grass to be cut can be set. That is, the cutting height becomes higher as the radius length increases. FIG. 4 shows a state in which the cutting height is the lowest among the settable cutting heights because the locking pin 36a is locked in the recess 39a having the smallest radius among the height adjusting recesses. On the contrary, as the radius length increases, the engagement position becomes higher and the cutting height becomes higher. Radius lengths of the plurality of height adjusting recesses 39 may increase with a predetermined relationship. Recess 39a may have the smallest radius and may correspond to the lowest cutting height, while recess 39g may have the largest radius and may correspond to the highest cutting height.

As described above, the pivot arm 30cL of the left lifting interlocking link mechanism 30L, the locking pin 36a, and the link stopper 38 constitute the cutting height adjusting device 35. However, in addition to these parts, a fan-shaped adjustment dial 40 for pivotally operating the link stopper 38 around a pivotal support of the second bracket 37, and a connection member (e.g., a wire 41) for interlocking the adjustment dial 40 and the link stopper 38 also constitute the cutting height adjusting device 35.

Figure 6:
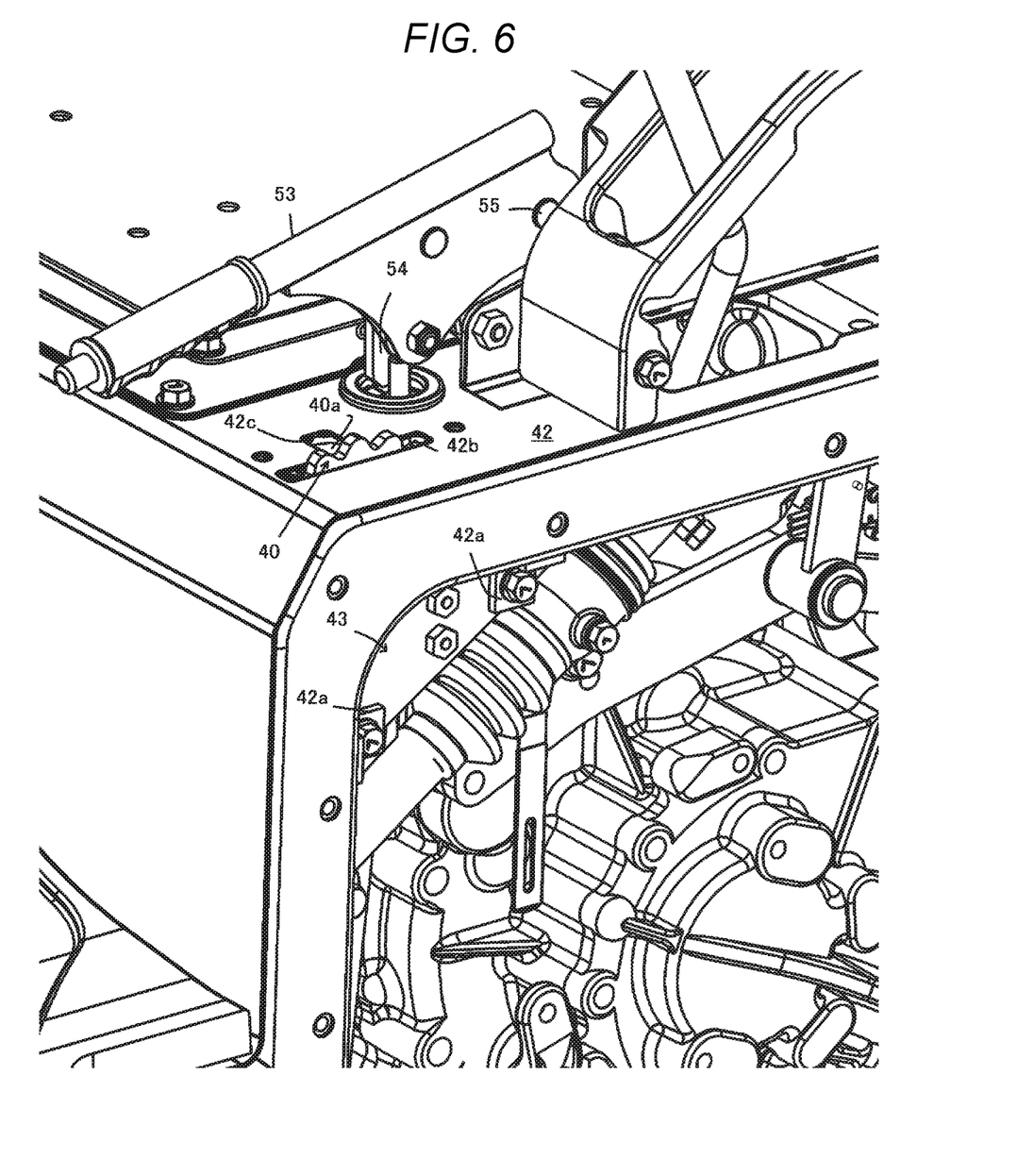
FIG. 6 is a perspective view showing an arrangement configuration of an adjustment dial and a parking lever in the above embodiment.

As shown in FIG. 6, the adjustment dial 40 is supported by using a seat support panel 42 that supports the operator seat 10. That is, the adjustment dial 40 is pivotably supported by a dial support bracket 43. The dial support bracket 43 is fixed to the seat support panel 42. The dial support bracket 43 can be attached and detached from the side of the machine body 1. Further, the pivot operation of the adjustment dial 40 is set to push and pull a driven portion 38*a* of the link stopper 38 via wire 41 as the connection member.

The dial support bracket 43 is fixed to the seat support panel 42 with bolts by using mounting plates 42*a*, 42*a* that are appropriately formed below the seat support panel 42. The dial support bracket 43 is arranged such that a part of an outer periphery thereof protrudes into a dial notch hole 42*b* provided in the seat support panel 42. Therefore, the protruding outer peripheral portion is configured so that a dial rotating operation can be performed along a longitudinal (e.g., front and rear) direction. The longitudinal direction may be perpendicular to the vertical direction and the horizontal direction. The adjustment dial 40 can be configured to hold its operation position at the adjustment position by a click mechanism 44.

Figure 7:
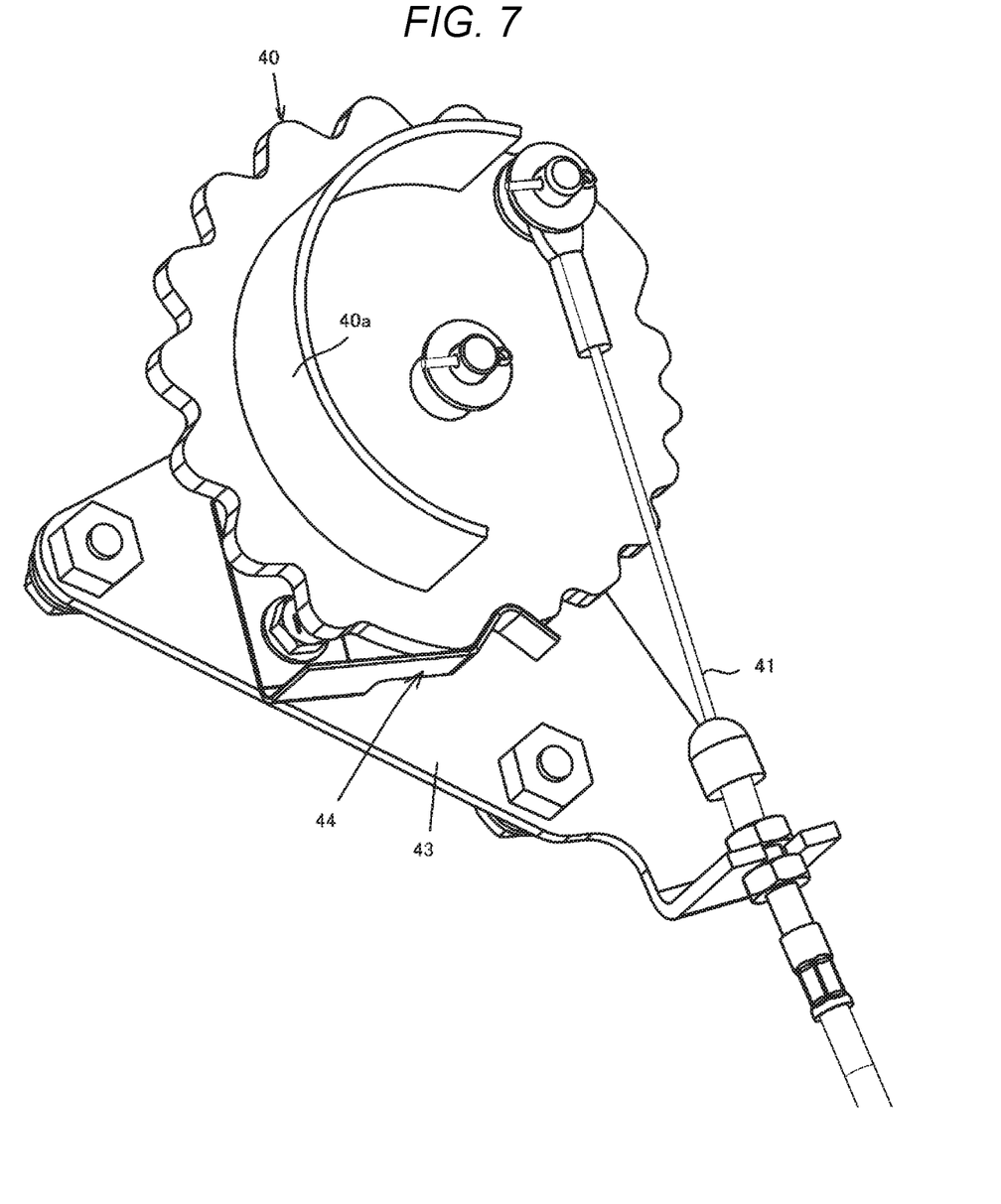
FIG. 7 is a perspective view of the adjustment dial part in the above embodiment.

As shown in FIG. 7, the click mechanism 44 is composed of concave-convex portions formed on an outer periphery of the adjustment dial 40 and a leaf spring member that presses against the outer periphery. The tip of the leaf spring member can be fitted in the concave portion of the concave-convex portions to restrict the rotation of the dial. The rotational position can be changed stepwise by applying a rotational force to the adjustment dial 40 against an urging force of the leaf spring member. The leaf spring member is fixed to the dial support bracket 43 with a bolt.

Further, a display board 40*a* having an arc surface is attached to one side of the adjustment dial 40 (in the illustrated example, the side of the operator seat 10 on the inside of the machine body) to attach a scale or the like. In this way, the setting cutting height can be confirmed by visually observing the scale from a window portion 42*c* extending to the dial notch hole 42*b*.

Figure 8:
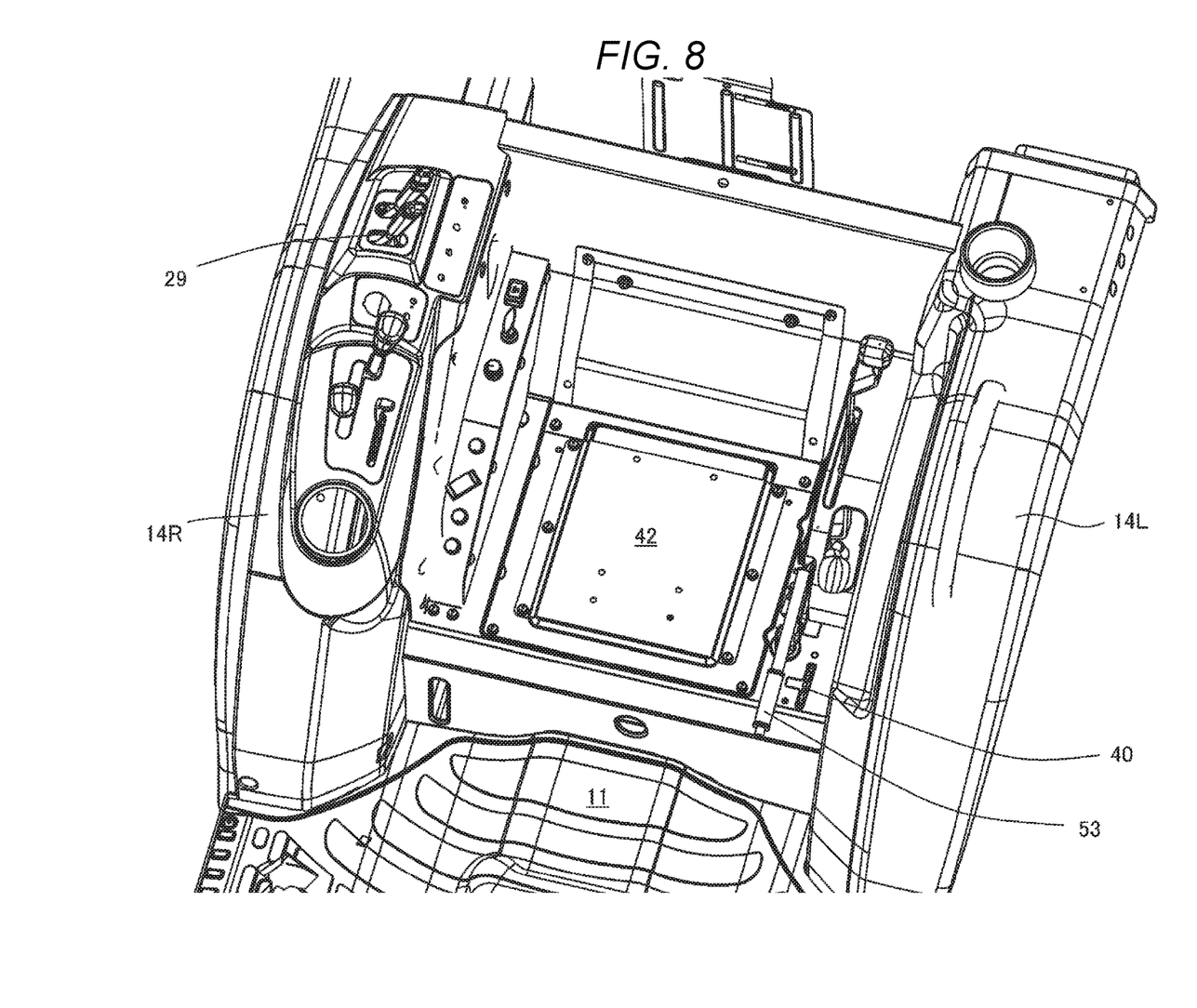
FIG. 8 is a plan view of left and right fenders and a seat support panel part in the above embodiment.

Further, when adjusting the cutting height, as shown in FIG. 8, an operator operates a hydraulic lifting lever 29 disposed on one side (right side in the illustrated example) of the operator seat 10 to raise a lower link 7*b* and to raise the mower 20 in conjunction therewith. Since the link stopper 38 is temporarily released from the engaged and locked state with the locking pin 36*a*, the adjustment dial 40 can be pivoted to set the cutting height to a desired cutting height. When the mower 20 is gradually lowered, the mower 20 can reach one setting recess of the height adjusting recesses 39*a* to 39*g* of the link stopper 38 to regulate the downward movement. In this way, a lawn mowing work can be performed at this setting cutting height.

Since the dial support bracket 43 for mounting the adjustment dial 40 is fixed to the mounting plates 42*a*, 42*a* of the seat support panel 42, the positional alignment between the dial notch hole 42*b* provided on the seat support panel 42 and the adjustment dial 40 can be easily carried out and the assembly becomes easy.

Subsequently, the configuration and interlocking configuration of the left and right brake mechanisms 17L, 17R will be described (see FIG. 2). Each of the brake mechanisms 17L, 17R has a known configuration that includes a brake disc fitted to a differential output shaft and slidable in an axial direction, a pair of brake cam discs, and a cam mechanism including a rotating cam plate and a ball, and the like. Further, the rear axles 18L, 18R can be braked by pressing the brake disc against a fixed wall portion in a state of being spread by the cam mechanism.

As shown in FIG. 3, axle cases 45L, 45R that support and cover the rear axles 18L, 18R are connected to the transmission case 5. In the left and right axle cases 45L, 45R, each of the brake mechanisms 17L, 17R is provided with each of brake operating shafts 46L, 46R interlocking with the cam mechanism so as to be pivotable around a horizontal axis, and brake arms 47L, 47R are connected to outer ends of the brake operating shafts 46L, 46R.

A brake pedal 48 that operates the brake mechanisms 17L, 17R is provided so as to be pivotable around the horizontal axis. A left pedal arm 50L and a right pedal arm 50R are provided at left and right protruding ends of a pedal interlocking shaft 49 that supports the base of the brake pedal 48. Further, the left pedal arm 50L and the left brake arm 47L are connected by a left brake rod 51L, and the right pedal arm 50R and the right brake arm 47R are connected by a right brake rod 51R. The left and right brake rods 51L, 51R are provided on the left and right sides of the transmission case 5, respectively.

The brake arms 47L, 47R pivotally supported by the brake operating shafts 46L, 46R have upper pieces having long arm lengths and lower pieces extending downward and having short arm lengths. The upper pieces are connected to the brake rods 51L, 51R, and the lower pieces are configured to interlock with a parking lever 53. That is, when a lower end of a parking interlocking rod 54 whose upper end is connected to the parking lever 53 is connected and the parking lever 53 is operated to pivot upward around a lever support shaft 55, a swing arm 56 provided at the lower center of the transmission case 5 is pulled up, and a cam body 57 provided integrally with the swing arm 56 presses the lower piece of the brake arm 47 by a cam action to actuate the brake arm 47 toward the braking side. The parking lever 53 and the parking interlocking rod 54 are arranged on the left side of the machine body 1. However, an arm support shaft 58 for supporting the swing arm 56 penetrates the transmission case 5 or is arranged on the lower surface of the transmission case 5 and is long in the left and right direction. Left and right swing arms 56L, 56R are connected to each end of the arm support shaft 58 so as to operate simultaneously. Furthermore, the arm support shaft 58 includes cam bodies 57L, 57R, and the left and right brake arms 47L, 47R can be simultaneously braked by operating the parking lever 53.

Since the wire 41 as the connection member is bendable as described above, one end of the wire 41 is connected to the driven portion 38*a* of the link stopper 38 arranged below the rear of the transmission case 5, and the wire 41 bypasses the vicinity of the connection point between the arm support shaft 58 and the parking interlocking rod 54 on the way. Then, the wire 41 reaches the dial support bracket 43 fixed to the seat support panel 42 in front of the parking interlocking rod 54 on the side surface of the transmission case 5. That is, the wire 41 can bypass the portion below the lower part of a parking interlocking mechanism including the parking interlocking rod 54, the lever support shaft 55, the swing arm 56, and the like, or can pass through the concave portion of the concavo-convex portions on the side surface of the transmission case 5, thereby avoiding interference. Since the wire 41 as the connection member is provided on the side surface of the machine body 1, it is possible to obtain an effect that the wire 41 can be retrofitted.

The parking interlocking rod 54 is oriented in a substantially vertical direction. The parking lever 53 is provided on the left side of the operator seat 10, and the parking interlocking rod 54 is provided on the left side of the transmission case 5. The parking lever 53 is supported by using the seat support panel 42. The seat support panel 42 is provided to extend in a step shape from a step 11 and connects left and right fenders 14L, 14R. The fenders 14L, 14R may be provided on sides of the operator seat 10. The seat support panel 42 supports the operator seat 10 so as to be slidably adjustable in the longitudinal direction.

Figure 9A:
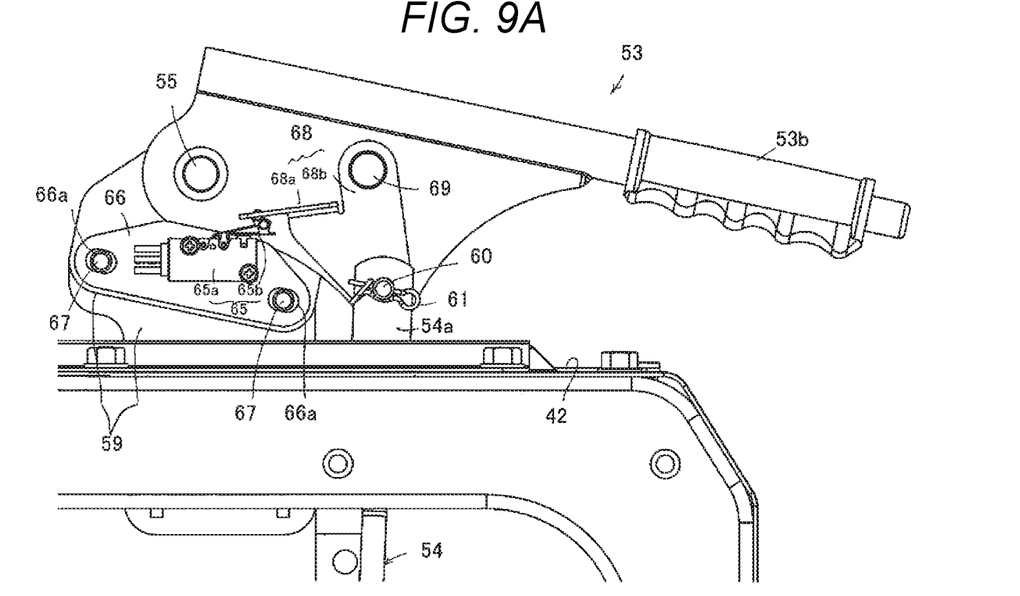
FIG. 9A is a perspective view showing a configuration of the parking lever in the above embodiment.
Figure 9B:
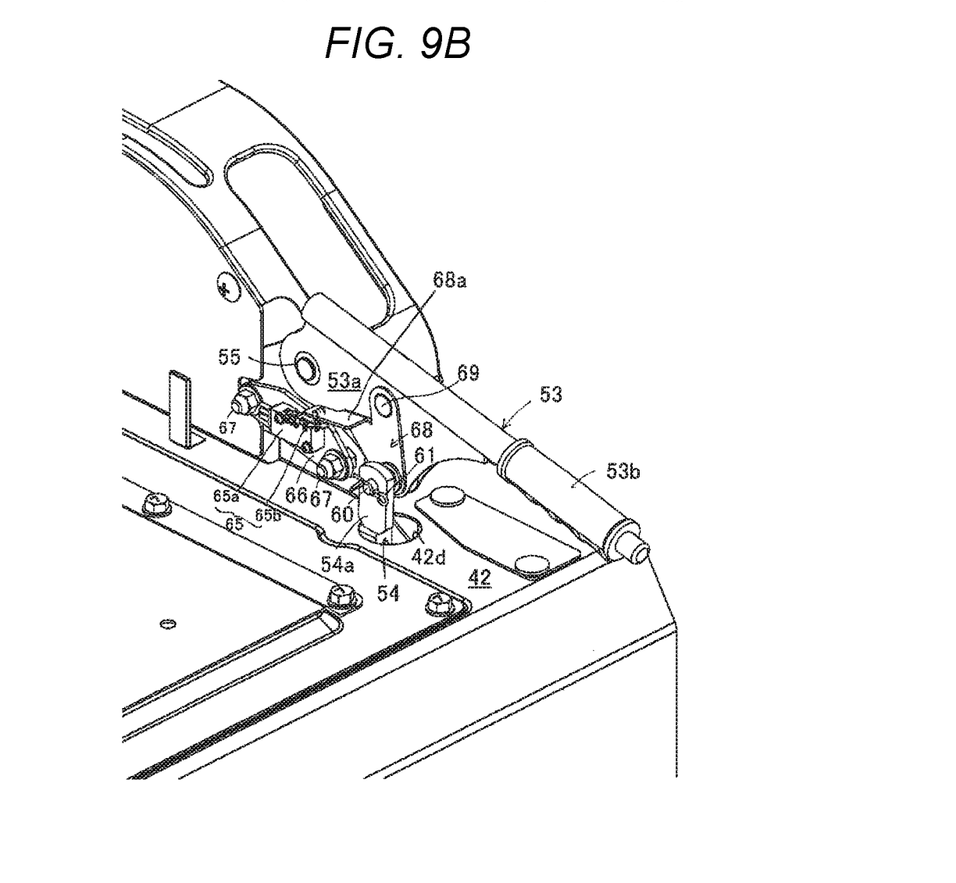
FIG. 9B is a side view thereof.

Subsequently, a support structure of the parking lever 53 will be described with reference to FIG. 9. The parking lever 53 includes a base portion 53a, an operating portion 53b, and the like. The base portion 53a is connected to a support bracket 59 provided on the seat support panel 42 via the lever support shaft 55. The base portion 53a is provided to be pivotable in the vertical direction by gripping the operating portion 53b. The parking interlocking rod 54 is connected to a lower central portion of a lever body in the longitudinal direction via a pin member 60. That is, an upper flat portion 54a of the parking interlocking rod 54 facing above the seat support panel 42 is connected, through a lever penetration hole 42d formed at an appropriate position of the seat support panel 42, to one side of the pin member 60 whose the other side is inserted and screwed into a connection hole of the parking lever 53. A snap pin 61 prevents the pin member 60 from coming off.

A brake switch 65 is provided inside the base portion 53a of the parking lever 53 (on the side of the operator seat 10). The brake switch 65 is provided in the form of a limit switch. A main body 65a of the brake switch 65 is detachably fixed to an adjustment support plate 66. The adjustment support plate 66 is detachably attached to the support bracket 59 provided in an upright posture on the seat support panel 42 by two adjusting bolts 67 at the front and rear. Insertion holes 66a, 66a of the adjustment support plate 66 are formed into long holes. The vertical mounting angle of the adjustment support plate 66 or the slight front and rear position of the adjustment support plate 66 can be adjusted along the long hole. An actuator 65b extending from the main body 65a of the brake switch 65 is configured to be switched OFF or ON by being pressed or retracted. An actuating member 68 is provided to contact the actuator 65b and switch it to OFF or ON. The actuating member 68 is configured to press or retract while moving in accordance with the vertical movement of the parking lever 53. The actuating member 68 is a plate member. The actuating member 68 includes a contact portion 68a capable of contacting with the actuator 65b, and a main body portion 68b mounted on the base portion 53a of the parking lever 53. Among these, the main body portion 68b is positioned by providing a hole portion fastened together by the pin member 60 and a hole portion fixed to the base portion 53a of the parking lever 53 by a rivet 69. When the parking lever 53 is in a lower position and the braking is released, the brake switch 65 is turned OFF because the actuator 65b is pressed. In the braking state where the parking lever 53 is pivoted upward, the pressing is released and the brake switch is turned ON.

As described above, the main body 65a of the brake switch 65 is provided on the support bracket 59 that supports the lever support shaft 55 of the parking lever 53, and the actuating member 68 having the contact portion 68a that contacts and presses the actuator 65b is fixedly provided on the parking lever 53. Therefore, the positional relationship between the brake switch 65 and the actuating member 68 is unlikely to be shifted, and a stable switch operation can be performed. Further, since the main body 65a of the brake switch 65 is fixedly attached to the adjustment support plate 66 whose attachment position can be adjusted with respect to the support bracket 59, the adjustment becomes easy.

Subsequently, the arrangement relationship between the parking lever 53 and the adjustment dial 40 of the cutting height adjusting device 35 will be described with reference to FIG. 8. The parking lever 53 and the adjustment dial 40 are arranged on the seat support panel 42 in a space formed between the operator seat 10 and the fender (the left fender 14L in the illustrated example). In this way, the parking lever 53 is arranged on the side closer to the operator seat 10, and the adjustment dial 40 is arranged on the side closer to the left fender 14L. With this arrangement, the hydraulic lifting lever 29 is arranged on the right side of the machine body 1, and the adjustment dial 40 is arranged on the left side of the machine body 1. In this way, after the mower 20 is raised, the adjustment dial 40 can be operated to change the cutting height. Further, a series of operation for lowering the mower 20 can be performed with both hands, which is efficient.

REFERENCE NUMERALS

1 Machine body
14 Fender
18 Rear axle
20 Mower
27 Lifting link
28 Lifting link
29 Lifting lever
30 Lifting interlocking link mechanism
38 Link stopper
40 Adjustment dial
41 Wire
42 Seat support panel
45 Axle case
53 Parking lever
54 Parking interlocking rod (Parking interlocking mechanism)
56 Swing arm (Parking interlocking mechanism)
58 Arm support shaft (Parking interlocking mechanism)

What is claimed is:
1. A work vehicle comprising:
a mower connected to a lower part of a machine body via lifting links;
a lifting interlocking link mechanism provided below the machine body configured to move the mower in a vertical direction;
a transmission case, and
a link stopper connected to an adjustment dial and configured to act on the lifting interlocking link mechanism to change a height of the mower, wherein
the adjustment dial is arranged on a seat support panel that supports an operator seat, the link stopper being arranged below the machine body,
the adjustment dial and the link stopper are connected by a wire,
fenders covering rear wheels are provided on sides of the operator seat in a horizontal direction,
a lifting lever configured to raise and lower the mower is provided on a first side of the machine body in the horizontal direction,
a parking lever is arranged on the seat support panel on a second side of the machine body in the horizontal direction,
the adjustment dial is arranged between the parking lever and the fender outside the parking lever,
an axle case for supporting a rear axle is provided at a rear part of the machine body,
the link stopper is arranged below the axle case,
a parking interlocking mechanism of the parking lever is arranged in front of the link stopper,
the parking interlocking mechanism comprises a parking interlocking rod, a swing arm, and an arm support shaft, wherein the arm support shaft supports the swing arm and the arm support shaft is provided at the bottom of the transmission case, and the wire is routed to bypass the arm support shaft from the front of the parking interlocking rod and connect to the link stopper.

2. The work vehicle according to claim 1, wherein the parking lever is arranged on the seat support panel on an opposite side of the machine body in the horizontal direction from the lifting lever.

3. The work vehicle according to claim 1, wherein the adjustment dial and the parking lever are provided on a same side of the machine body in the horizontal direction, and the adjustment dial is arranged between the parking lever and the fender on the same side of the machine body in the horizontal direction.

4. The work vehicle according to claim 1, wherein the link stopper comprises:
a plurality of height adjusting recesses provided at predetermined intervals in a circumferential direction.

5. The work vehicle according to claim 4, wherein respective height adjusting recesses are formed in different radius lengths.

6. The work vehicle according to claim 5, wherein the link stopper is configured such that lowered positions of the mower are restricted by selectively setting one of the plurality height adjusting recesses based on a pivot operation.

7. The work vehicle according to claim 5, wherein the link stopper is configured to change a cutting height of the mower corresponding to the different radius lengths of the plurality of height adjusting recesses.

8. The work vehicle according to claim 6, wherein the link stopper includes a lock mechanism.

9. The work vehicle according to claim 1, wherein the adjustment dial is pivotably supported by a dial support bracket fixed to the seat support panel.

10. The work vehicle according to claim 9, wherein the dial support bracket is detachably mounted on the seat support panel.

11. The work vehicle according to claim 1, wherein the adjustment dial is configured to hold its operation position by a click mechanism.

12. The work vehicle according to claim 11, wherein the click mechanism comprises concave-convex portions formed on an outer periphery of the adjustment dial and a leaf spring member configured to press against the outer periphery.

13. The work vehicle according to claim 1, wherein the wire includes a bendable wire.

14. The work vehicle according to claim 1, wherein the wire is provided on a side surface of the machine body.

15. The work vehicle according to claim 1, wherein the parking interlocking rod is oriented in a substantially vertical direction.

* * * * *

UNITED STATES PATENT AND TRADEMARK OFFICE
CERTIFICATE OF CORRECTION

| | | |
|---|---|---|
| PATENT NO. | : 11,758,842 B2 | Page 1 of 1 |
| APPLICATION NO. | : 17/066290 | |
| DATED | : September 19, 2023 | |
| INVENTOR(S) | : Yoshihisa Tsuduki | |

It is certified that error appears in the above-identified patent and that said Letters Patent is hereby corrected as shown below:

In the Claims

Claim 6, Column 9, Lines 23-24, "plurality height" should read as --plurality of height--.

Signed and Sealed this
Seventh Day of November, 2023

Katherine Kelly Vidal
*Director of the United States Patent and Trademark Office*